(12) United States Patent
Smith et al.

(10) Patent No.: US 9,895,849 B2
(45) Date of Patent: Feb. 20, 2018

(54) METHOD OF MANUFACTURING A WIND TURBINE BLADE USING PRE-FABRICATED STACKS OF REINFORCING MATERIAL

(71) Applicant: Vestas Wind Systems A/S, Aarhus N. (DK)

(72) Inventors: Jonathan Smith, Hampshire (GB); Steve Wardropper, Hampshire (GB)

(73) Assignee: Vestas Wind Systems A/S, Aarhus N. (DK)

( * ) Notice: Subject to any disclaimer, the term of this patent is extended or adjusted under 35 U.S.C. 154(b) by 315 days.

(21) Appl. No.: 14/654,220

(22) PCT Filed: Dec. 18, 2013

(86) PCT No.: PCT/DK2013/050441
§ 371 (c)(1),
(2) Date: Jun. 19, 2015

(87) PCT Pub. No.: WO2014/094787
PCT Pub. Date: Jun. 26, 2014

(65) Prior Publication Data
US 2015/0314536 A1    Nov. 5, 2015

(30) Foreign Application Priority Data

Dec. 21, 2012 (DK) .................. 2012 70817

(51) Int. Cl.
*B29C 70/34* (2006.01)
*B29B 11/16* (2006.01)
(Continued)

(52) U.S. Cl.
CPC .............. *B29C 70/34* (2013.01); *B29B 11/16* (2013.01); *B29C 31/08* (2013.01); *B29C 70/30* (2013.01);
(Continued)

(58) Field of Classification Search
None
See application file for complete search history.

(56) References Cited

U.S. PATENT DOCUMENTS

| | | | | |
|---|---|---|---|---|
| 6,995,099 | B1* | 2/2006 | Nishimura | B29C 70/083 428/113 |
| 2008/0304971 | A1* | 12/2008 | Liebmann | B29C 70/086 416/20 R |
| 2011/0308702 | A1* | 12/2011 | Serey | B29C 70/24 156/93 |

FOREIGN PATENT DOCUMENTS

| | | |
|---|---|---|
| EP | 1125728 A1 | 8/2001 |
| WO | 06066593 A1 | 6/2006 |

(Continued)

OTHER PUBLICATIONS

European Patent Office, Search Report and Written Opinion issued in International Application No. PCT/DK2013/050441 dated Mar. 20, 2014.

(Continued)

*Primary Examiner* — Barbara J Musser
(74) *Attorney, Agent, or Firm* — Wood Herron & Evans LLP

(57) ABSTRACT

A method of manufacturing a wind turbine blade using pre-fabricated stacks of reinforcing material is described. The stacks 14 comprise a plurality of plies of fiber material, joined together along a side edge to form a spine. The opposite edges of the stack are left unjoined so that the plies can separate and slide across one another. In doing so, the stacks can be stored flat, but on installation into a curved mold 12 profile, the plies may slide to adopt the curved shape of the mold. The stacks extend from a point near the leading or trailing edge of the mold to an intermediate point (Continued)

on the mold surface. The stacks may be used to construct the thickened root section of a wind turbine blade.

15 Claims, 7 Drawing Sheets

(51) Int. Cl.
*B29D 99/00* (2010.01)
*B29C 70/30* (2006.01)
*B29C 31/08* (2006.01)
B29L 31/08 (2006.01)

(52) U.S. Cl.
CPC .... *B29D 99/0025* (2013.01); *B29L 2031/085* (2013.01); *Y02E 10/721* (2013.01); *Y02P 70/523* (2015.11); *Y10T 156/1044* (2015.01); *Y10T 428/24008* (2015.01); *Y10T 428/24752* (2015.01); *Y10T 428/24777* (2015.01)

(56) References Cited

FOREIGN PATENT DOCUMENTS

| | | |
|---|---|---|
| WO | 10097657 A1 | 9/2010 |
| WO | 12042261 A1 | 4/2012 |

OTHER PUBLICATIONS

Danish Patent and Trademark Office, Search Report issued in Application No. PA 2012 70817 dated Aug. 6, 2013.

\* cited by examiner

METHOD OF MANUFACTURING A WIND TURBINE BLADE USING PRE-FABRICATED STACKS OF REINFORCING MATERIAL

The present invention relates to a method of manufacturing a wind turbine blade, and more specifically to a method of manufacturing a wind turbine blade using pre-fabricated stacks of reinforcing material.

An example horizontal axis wind turbine is illustrated in FIG. 1. The wind turbine 1 comprises a tower 2, a nacelle 3 mounted at the top of the tower and a rotor 4, coupled directly to a generator within the nacelle 3, or indirectly via a gearbox. The rotor 4 comprises at least one rotor wind turbine blade 5 coupled to a central rotor hub 6.

FIG. 2 shows a wind turbine blade 5 in a cross-sectional elevation view. The blade has a root portion 7 at which it connects to the central hub. The root section is generally circular in cross section and for blades which are 80 m or more long can be as wide as 4 or 5 meters in diameter. At the opposite and of the blade to the root 7 is the blade tip 8. The direction along the blade between the root and the blade is known as the span-wise direction. In the lateral direction, known as the chord-wise direction, the blade extends between a leading edge 9 and a trailing edge 10.

The at least one wind turbine rotor blade 5 of the rotor has an aerofoil cross-section that, when subject to a sufficient passing air flow rate, produces lift. The lift force drives the turbine by causing a turning moment that drives the rotor 4 about the central hub 6. The rotation is then converted to electric power by the generator within the nacelle 3.

The lift force on the wind turbine blade 5 generally increases along the length of the blade in the span-wise direction from the root 7 towards the tip 8. The lift force generates an associated bending moment in the wind turbine blade, which at a given point along the length of the blade, will be the result of the sum of all of the lift forces incident on the blade between the given point and the tip 8 of the wind turbine blade where the lift force is greatest.

The bending moment in the wind turbine blade 5 is therefore greatest at the root portion 7 of the blade, where the blade 5 is proximal to and connects to the central hub 6, and there is a higher requirement for flexural strength at the root portion 7 of the blade 5 than at the tip. The root section of the blade is therefore typically designed to withstand much greater loading than other parts of the blade.

Wind turbine blades 5 are typically made out of fibre-reinforced plastics. FRP, such as carbon or glass fibres in a polymer or epoxy resin. It is desirable that wind turbine blades be as light as possible, and the outer shell of the wind turbine blade will therefore typically comprise a relatively small number of layers of such material, with internal reinforcements in the blade providing a load bearing structure.

To assemble the blade, fibre-reinforced plastic material is laid up in an appropriately shaped blade mould, with the load bearing sections such as the spars and reinforcing sections for the blade root, and cured. The mould for a single blade typically comprises two mould halves, each corresponding to one half of the blade from root 7 to tip 8 and from leading edge 9 to trailing edge 10. Each half section of the blade is separately fabricated and once completed the two halves are brought together and joined. The mould halves are then finally removed. Production of the blade is a complicated process, requiring the assembly of a number of different materials within a sizeable blade mould, within a limited period of time.

In order to reinforce the blade outer shell, a fibre with high stiffness or an increased number of layers of the FRP may be used. Using a high stiffness fibre is often a more expensive option and it is often desirable to reinforce the blade structure with an increased thickness of FRP, particularly in the root section 7. However, increasing the number of layers of FRP increases the duration of time it takes to lay each of the individual FRP sheets into a mould of the desired wind turbine blade 5 shape. Each sheet of FRP must be carefully laid into the mould ensuring that there are no formation defects, such as bends, kinks or creases, in the sheets. Any bends, kinks or creases in the sheets of FRP will lead to a concentration of stress and will therefore reduce the strength of the fibre.

Furthermore, the respective sheets of FRP are bonded together in a resin matrix and the whole operation of assembling the wind turbine blade 5 must be achieved within a given time. It would be desirable to provide a method of manufacturing the wind turbine blade 5 using a method that enables the sheets of FRP, or fibre, to be laid into the mould in a shorter period of time.

In this regard, it is known to stitch a number of fibre sheets into a stack of fibre sheets so that all of the sheets of the fibre in the stack can be laid into the mould at the same time, thus reducing the average amount of time taken to lay each individual sheet into the mould. However, stitching the plurality of fibre sheets into a flat sheaf or stack can result in formation defects occurring as the flat stack is laid into the mould, as the stack must necessarily follow the curved profile of the mould. This problem is particularly prevalent in portions of the wind turbine blade 5 that have a high curvature, such as the root portions 7, since these portions will require the most inter-sheet movement when the flat stack is curved within the profile of the mould. We have also appreciated therefore that it would be desirable to provide a method of manufacturing a wind turbine blade, using a mould, which reduces the tendency of defect formation in the fibre respective sheets.

SUMMARY OF THE INVENTION

In accordance with an embodiment of a first aspect of the invention, a method of manufacturing a wind turbine blade is provided. The method comprises using a mould surface defining the profile of one half of the shell of the wind turbine blade in the blade chord direction from the blade trailing edge to the blade leading edge, and a mould root section corresponding to a root section of the wind turbine blade; a) receiving a plurality of stacks of reinforcing material for installation in the wind turbine blade mould, wherein each stack includes a plurality of plies of reinforcing material joined to one another along a common edge to form a spine, and each stack has a length such that when laid in the wind turbine blade mould the stack extends along the mould surface of the blade mould from either the trailing or leading edge to a point on the mould surface between the trailing or leading edge; b) laying a first stack of reinforcing material in the mould so that the spine of the first stack is positioned at the either the trailing or leading edge of the mould and so that the stack extends to a point on the mould surface between the trailing and leading edge; and c) laying a second stack of reinforcing material in the mould so that the spine of the second stack is positioned at the other of the trailing or leading edges and so that the stack extends to a point on the mould surface between the trailing and leading edge and meets the first stack.

The method therefore allows the use of pre-fabricated stacks of sheets of reinforcing material to be used in the production process. This means that more sheets of reinforcing material can be laid in the mould in a given time. The fact that two stacks are required to be laid across the half chord width of the blade half means that the stacks follow the mould's surface geometry more easily, and creasing of the sheets is less likely to occur.

In one embodiment, step b) comprises: suspending the first stack of reinforcing material above the mould so that its spine is upwards and so that the edge of the stack opposite the spine hangs downwards; after the suspending step, lowering the first stack towards the mould surface so that the edge of the stack opposite the spine makes contact with the mould surface first; continuing to lower the first stack into the mould, keeping contact between the mould surface and the first stack, until the first stack is in position; and wherein step c) comprises: suspending the second stack of reinforcing material above the wind turbine blade mould so that its spine is upwards, and so that the edge opposite the spine hangs downwards; after the suspending step, lowering the second stack towards the mould surface so that the edge of the stack opposite the spine makes contact with the mould surface first; continuing to lower the second stack into the mould, keeping contact between the mould surface and the second stack, until the second stack is in position.

Lowering the stack in this way allows the edge of the stack to be lowered until it engages part of the mould surface. Subsequently, further lowering of the stack allows that edge to slide downwards along the curvature of the mould profile, while the material of the stack behind the edge already in contact is brought into engagement with the mould surface. Suspending of the stack while it is being lowered can be substantially vertical, so that gravity ensures that creases do not form between the sheets of material in the stack, and so that the material of the stack behind the edge that is already in contact with the mould surface is brought into contact with the surface in a controlled way. In this way, the stack can effectively slide down the curved surface of the mould from a point just inside of the trailing or leading edge to an intermediate point. This is particularly effective in the blade root portion of the blade where the curvature of the mould is greatest and where there is often most need for reinforcing stacks of material.

In an alternative method, step b) comprises: suspending the first stack of reinforcing material above the root section of the wind turbine blade mould so that its spine is upwards, and so that the edge of the stack opposite the spine hangs downwards over a point of the mould surface intermediate the trailing and leading edge; after the suspending step, lowering the first stack towards the mould surface so that the edge of the stack opposite the spine makes contact with the mould wall surface; lowering the spine of the stack towards one of the trailing or leading edges of the mould, until the first stack is in position; and wherein step c) comprises: suspending the second stack of reinforcing material above the root section of the wind turbine blade mould so that its spine is upwards, and so that the edge of the stack opposite the spine hangs downwards over a point of the mould surface intermediate the trailing and leading edge; after the suspending step, lowering the second stack towards the mould surface so that the edge of the stack opposite the spine makes contact with the mould surface first, or with the stack already in place; lowering the spine of the second stack towards the other of the trailing or leading edges of the mould, until the second stack is in position against the first.

In this method, positioning the stack over the middle of the mould surface allows the end of the stack to be roughly positioned in the right place in the mould, before the rest of the stack is laid up against the curved profile of the mould surface. In this way, the open end of the stack, which is the most likely rumple or crease as the stack is placed in the mould moves very little during the installation process. A final pull on the spine of the stack as it is laid up against either the trailing edge or leading edge of the mould, causing the open end to move just a little, provides further reassurance as any rumpling of the stack near the open end will then be partly smoothed out by the final controlled movement.

Optionally, during this method, after the edge of the first stack opposite the spine makes contact with the mould surface, an anchor may be placed on the edge of the first stack opposite the spine for the subsequent step of lowering the spine of the first stack; and after the edge of the second stack opposite the spine makes contact with the mould surface or the stack already in place, placing an anchor on the edge of the second stack opposite the spine for the subsequent step of lowering the spine of the second stack.

The anchor further ensures that the open end of the stacks move as little as possible once they are in their approximate desired position in the mould.

Advantageously, the methods of either embodiments comprise, in the suspending step, suspending the first and/or the second stacks vertically above the mould. This prevents creases forming in or between the sheets of the stack of reinforcing material as the stacks are lifted into place.

Further, the suspending steps may comprise pausing with the first and the second sheets suspended vertically above the mould. A pause of a few seconds allows any remaining creases in or between the sheets of the stack to fall away under gravity.

In the above methods, the edge of the stack opposite the spine may be wedge-shaped or chamfered, so that when the first and the second stacks are in position in the mould the chamfered edge of the first stack lies across the chamfered edge of the second stack. This provides a greater surface area at which the edges of the first and second stacks may be joined together, making the joining process easier and more reliable.

In a further aspect, the invention provides a method of fabricating stacks of reinforcing material for use in a method of manufacturing a wind turbine blade, comprising: cutting a plurality of plies of reinforcing material to form a stack such that when laid in a wind turbine blade mould the stack extends along the mould surface of the blade mould from either the trailing or leading edge to a point intermediate the mould wall between the trailing and leading edge; joining the plurality of plies of reinforcing material to one another along a common edge to form a spine; leaving the edge of the plurality of plies of reinforcing material opposite the spine unjoined to form an open end of the stack, and so that the plies in the stack are free to slide across one another.

Forming the stack in this way means that the plies are joined to one another for ease of storage and installation, but are free to slide across one another at the point of installation in the mould so that they can adapt to the shape of the mould surface without introducing creases or tension in the stack.

Advantageously, the method of forming the stack refrains from adding seams to the stack that extend fully or partially between the sides of the stack between the spine and the open end. Any such seams would mean more locations at which the plies in the stack are joined to one another, meaning that there would be more locations at which tension could be introduced once the flat stack is laid into the curved mould.

The lengths of the plies may be cut to give the stack a chamfer or wedge-shape at its open end. The chamfering provides a greater surface area at which the edges of the first and second stacks may be joined together, making the joining process of one stack to another easier and more reliable. The wedge shape may also be tailored to conform to the curvature of the mould surface so that the plies in the stack extend to a desired point intermediate the trailing and leading edges.

The method may also comprise attaching a hem to the edge of the stack forming a spine, wherein the hem allows the stack to be handled. An attachment member may also be added to the hem for engaging with one or more support members, such as cranes or lifting rails.

The reinforcing material in the stacks may be one or more of a glass fibre material, a carbon fibre, an aramid fibre, a polyester fibre material or a combination of these.

The method may further comprise laying stacks of reinforcing material in the root section of a wind turbine blade to cover a region of the mould from the blade root bearing to a point at which the spar caps begin. In this way the root section of the blade can be formed quickly and reliably.

Further, the side of the stacks of reinforcing material adjacent the point at which the spar caps begin is chamfered or wedge-shaped so that once installed the thickness of the stack decreases in the span-wise direction of the blade. This allows the stacks of reinforcing material to be integrated into the spars or spar caps in such a way that there are no sudden discontinuities or breaks in the resulting structure. This allows loads to be transmitted along the load bearing structure.

In a further aspect the invention provides a stack of reinforcing material for use in the method of manufacturing a wind turbine blade.

BRIEF DESCRIPTION OF THE DRAWINGS

Embodiments of the invention will now be described in more detail, by way of example only, and with reference to the following drawings in which.

DETAILED DESCRIPTION OF THE EMBODIMENTS

Figure 1:
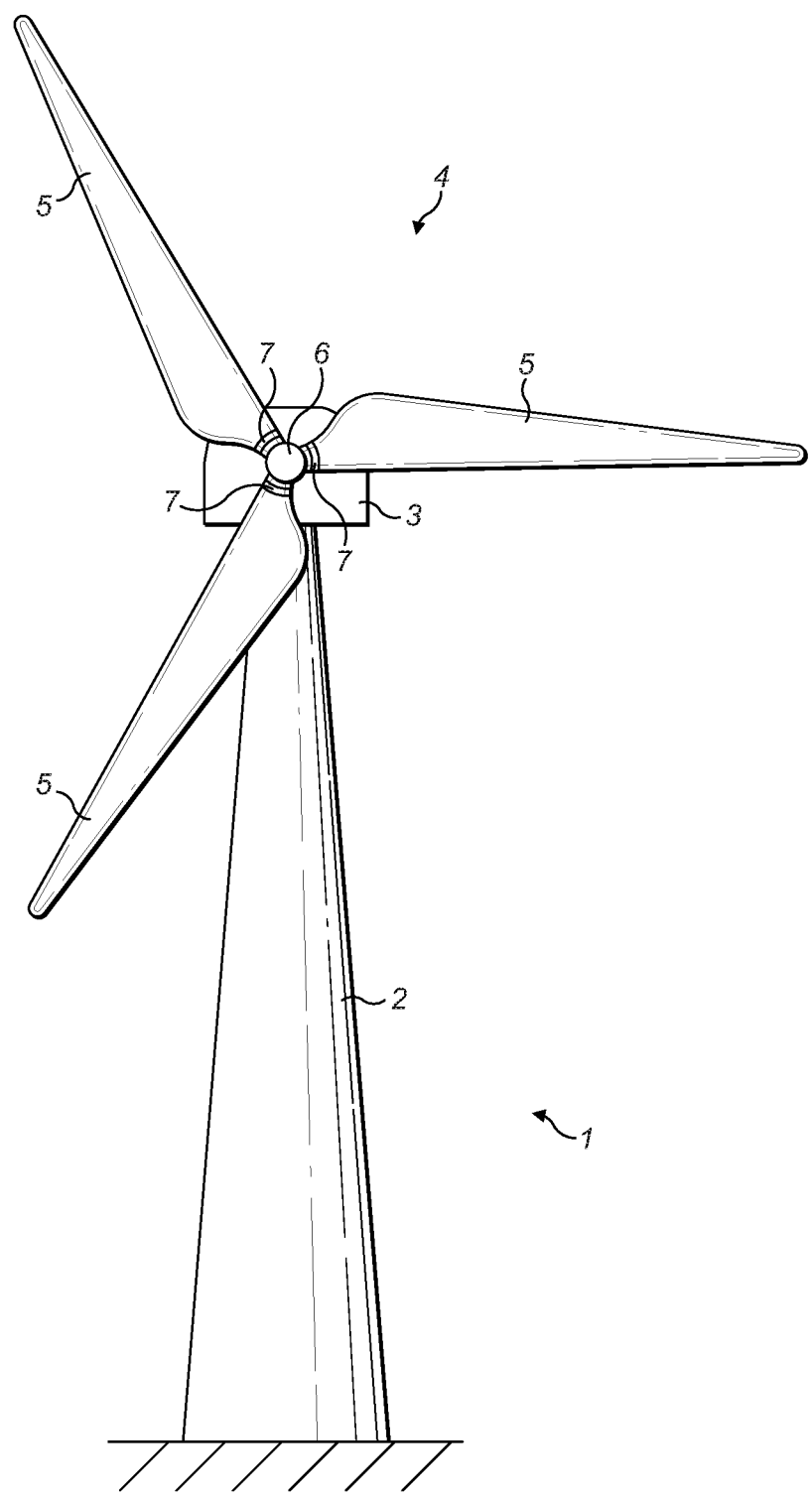
FIG. 1 illustrates the main structural components of a wind turbine.

Throughout the following description of the preferred embodiments of the present invention, and in the drawings, the same reference numerals are used in indicate the same, or corresponding, structural features.

Figure 2:
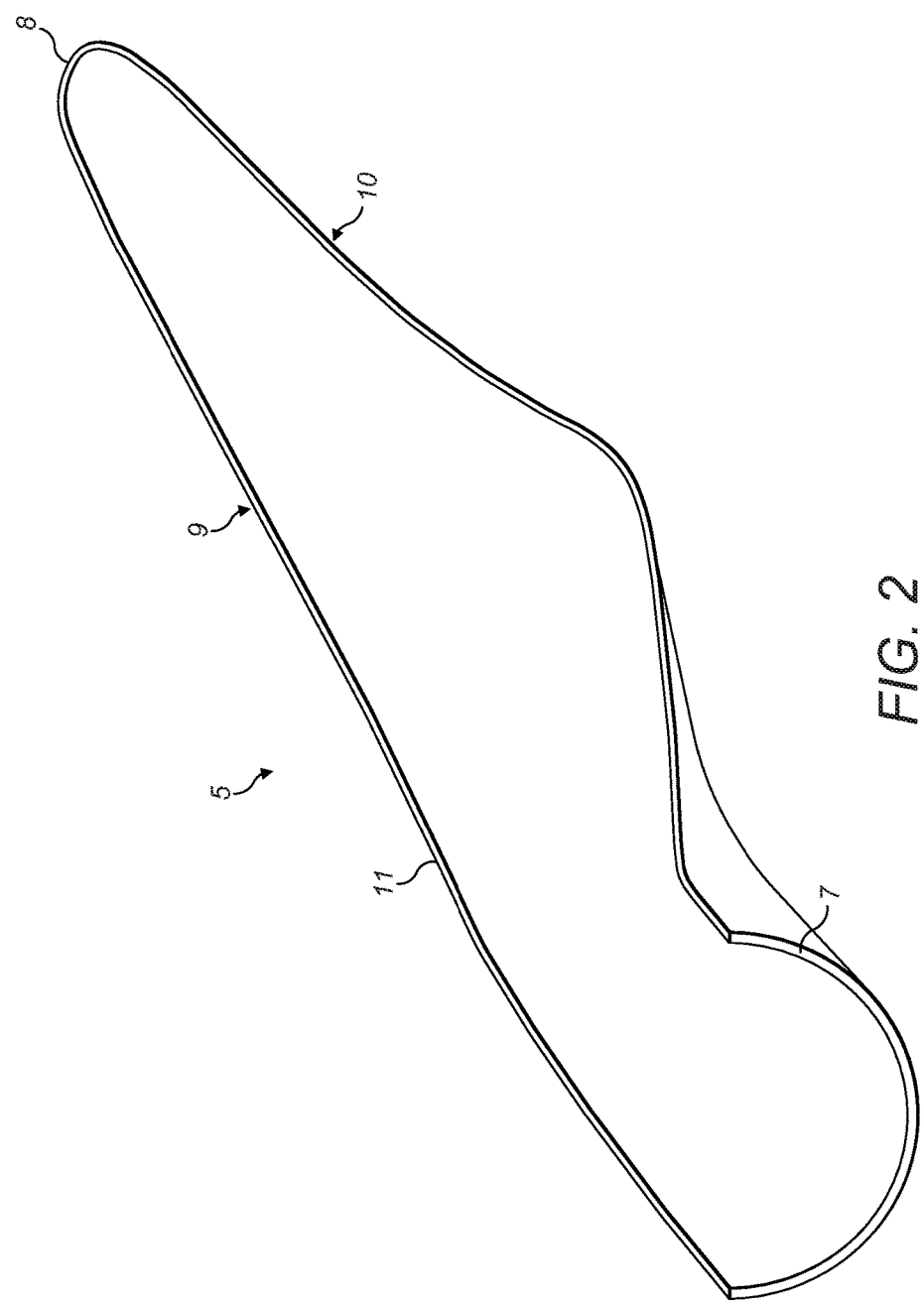
FIG. 2 is a schematic illustration of the inner surface of one half of a wind turbine blade.
Figure 3:
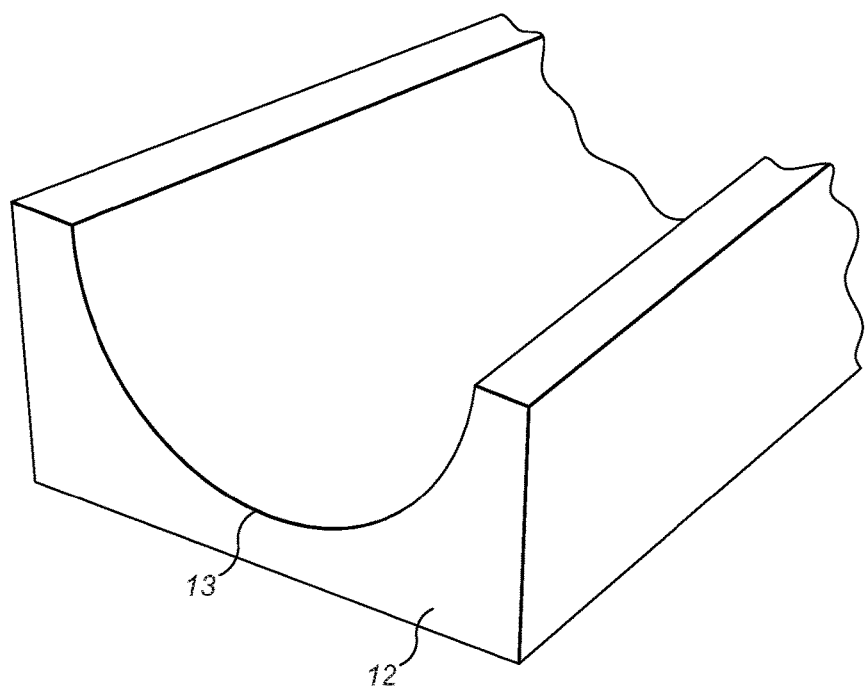
FIG. 3 is an illustration of a root section of a mould for forming one half of a wind turbine blade.

Referring to FIG. 2, one half shell 11 of a wind turbine blade 5 is illustrated. The half shell 8 of the wind turbine blade 5 may be formed by laying sheets of material, such as a glass, carbon, aramid, polyester or composite fibre material, into a mould (not shown) having an interior profile or mould surface that corresponds to the desired exterior blade profile. A portion of a mould 12 corresponding to the desired exterior profile of the root section of one blade half shell is shown in FIG. 3. Reference number 13 indicates the mould surface.

In a preferred embodiment of the present invention, at least a part of the wind turbine blade is fabricated using stacks of reinforcing material that are part preformed before they are laid in the mould. Forming the root section of the wind turbine blade using such preformed stacks is particularly advantageous as the number of sheets of fibre required in the root is typically high to provide the required structural strength and load bearing ability. Removing the need to lay such sheets individually by using the preformed stacks of sheets means that the root section can be quickly and effectively constructed and reinforced. The preformed stacks of reinforcing material are first formed to be flat, which is useful for storage and transport, but must be able to adapt later to the curved surface of the mould without introducing creases or tension in the stack.

Figure 4:
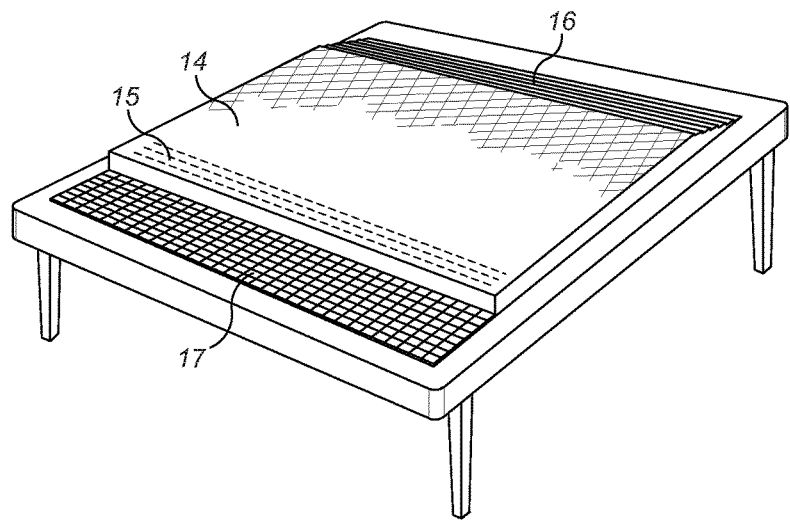
FIG. 4 is a perspective view of a fibre stack according to an embodiment of the invention.

Turning to FIG. 4, in an embodiment of the present invention, a first stack, or preform, 14 is constructed by joining together a plurality of fibre sheets along a first edge of the stack to create a spine. The fibre sheets are 'dry', that is they are not pre-impregnated with resin, but will instead be later infused with resin in a conventional resin infusion process. Joining of the sheets together at the spine may be achieved using stitching 15 as shown in FIG. 4. In alternative embodiments other methods of joining may be employed, such as applications of adhesive or heat bonding. The edge of the plurality of fibre sheets opposite the spine is left unjoined to form an open end at which the sheets can separate. Additionally, the intermediate or adjacent edges of the sheets are also preferably left unjoined, so that the stacks are in fact only held together along one edge. This allows the adjacent fibre sheets to slide past one another, in much the same way as the pages of a book can slide past one another, allowing the sheets to adapt to the curved shape of the mould without introducing tension in the stack. In FIG. 4, the stack of sheets is illustrated as being rectangular in shape, although other shapes are possible as will be discussed later.

The length of the sheets in the first stack is such that the stack runs from either the leading edge 9 or the trailing edge 10 of the mould surface to an intermediate point between the leading and trailing edges. In a preferred embodiment, the stack is a half-chord in length, and two stacks are required to fill the mould between the leading and trailing edges, with the stacks abutting one another at the midpoint of the mould surface. In other embodiments, the two stacks may abut one another at a point that is not necessarily the midpoint. In this case, the two stacks will of course be slightly different lengths.

The first stack 14 is preferably formed from fibre sheets or plies with lengths that vary in the direction perpendicular to the spine, in order to provide a wedge shape or chamfer 16 on the edge of the first stack opposite the spine edge. The chamfer of one stack of reinforcing sheets can then be placed in the opposite orientation to the chamfer of the other reinforcing stack in the pair, so that the two chamfered sections lay flat over one another and can be easily joined and sealed.

Figure 5:
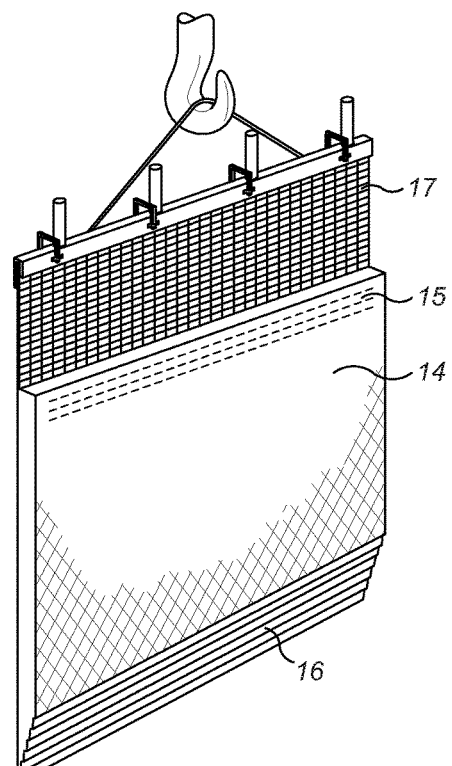
FIG. 5 is a perspective view of a suspended fibre stack according to an embodiment of the invention.

Furthermore, as shown most clearly in FIG. 4, the first stack has a hem or webbing that provides a mounting surface 17, and which joins the stack at the edge which forms the spine, and from which the first stack can be suspended. In the embodiment shown in FIG. 4 the mounting surface 17 is a webbed section that is joined to the stack by the spine stitches 15. FIG. 5 shows the first stack 14 being suspended by the webbed mounting surface 17 and more clearly shows the stepwise chamfered edge 16 of the first stack. Suspending the stack can be achieved using any suitable lifting mechanism, such as a crane hook, guide rail or cable, for example. In FIG. 5, a lifting beam is attached to the webbing 17 via a plurality of fasteners. A cable on the lifting beam then passes over a crane hook.

A method of laying the stacks of reinforcing material in a blade mould in order to construct the root portion of a wind turbine blade will now be described with reference to FIGS. 6 to 9.

Figure 6:
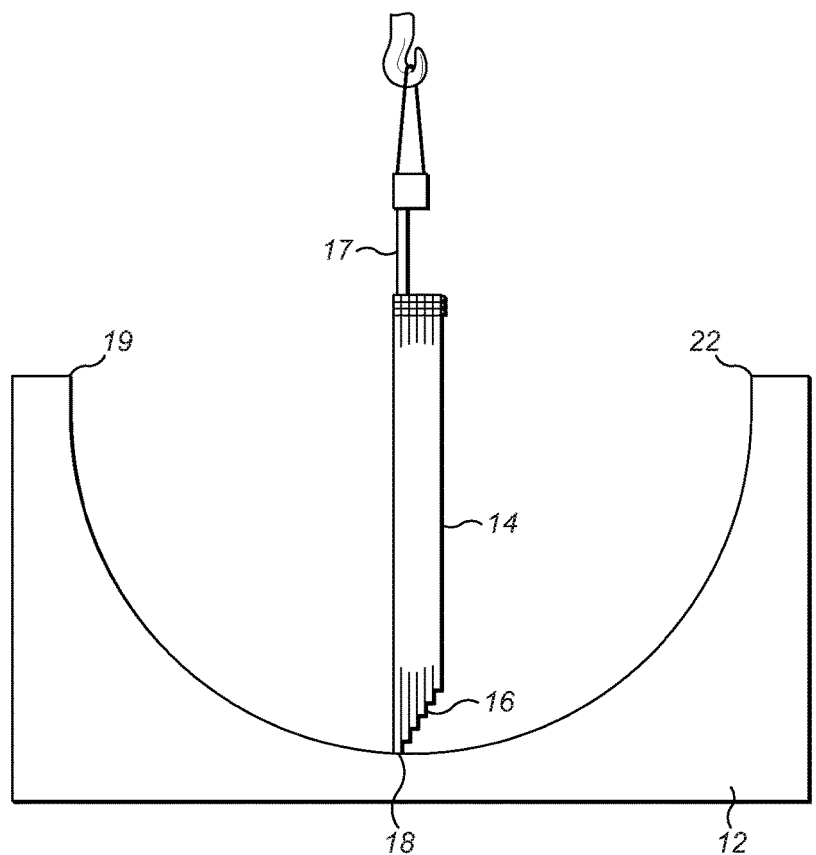
FIG. 6 is a side view of a fibre stack according to FIG. 5 suspended over a mould according to FIG. 3.

With reference to FIG. 6, a first stack 14 of reinforcing material is picked up by a lifting mechanism and suspended over the mould 12. Either when it is first lifted or when it is in position over the mould, installation pauses allowing the stack to remain suspended vertically for at least a second or two. Suspending the stack vertically in this way, allows creases in or between the plurality of sheets to fall out under the weight of the respective sheets. This improves the overall reliability of the installation as it means that there is less chance of installing sheets in the mould with creases. An operator may actively shake the stack, either at its open end, or near its spine, to facilitate this process.

Once the stack is in position and an operator is satisfied it is free of creases, the stack is lowered until the edge of the first stack opposite the spine comes into contact with the interior profile 13 of the mould. In the example illustrated, this is approximately at the midpoint 18 of the mould surface. The lifting mechanism is lowered further while being moved towards the edge 19 of the mould surface, which may correspond to the leading edge of the blade profile. This means that the first stack is lowered with the edge of the first stack opposite the spine remaining in contact with the midpoint 18 of the mould surface while the spine is brought towards edge 19.

Figure 7:
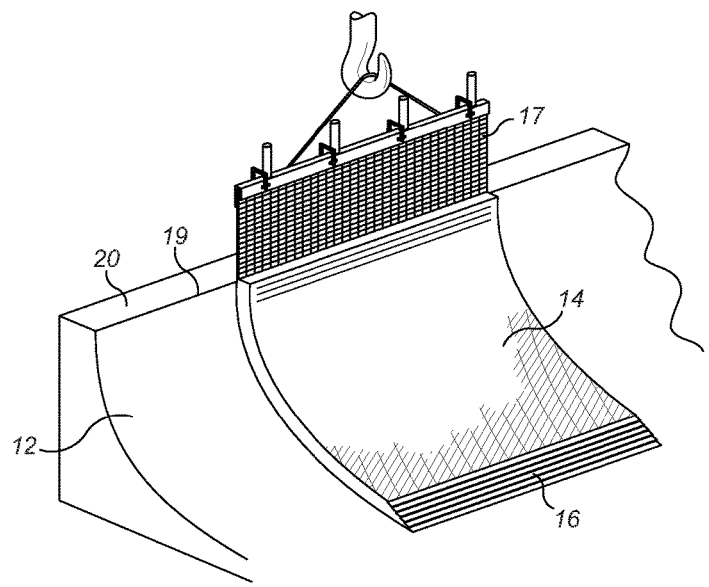
FIG. 7 is a perspective view of a fibre stack according to an embodiment of the invention being laid into a mould.
Figure 8:
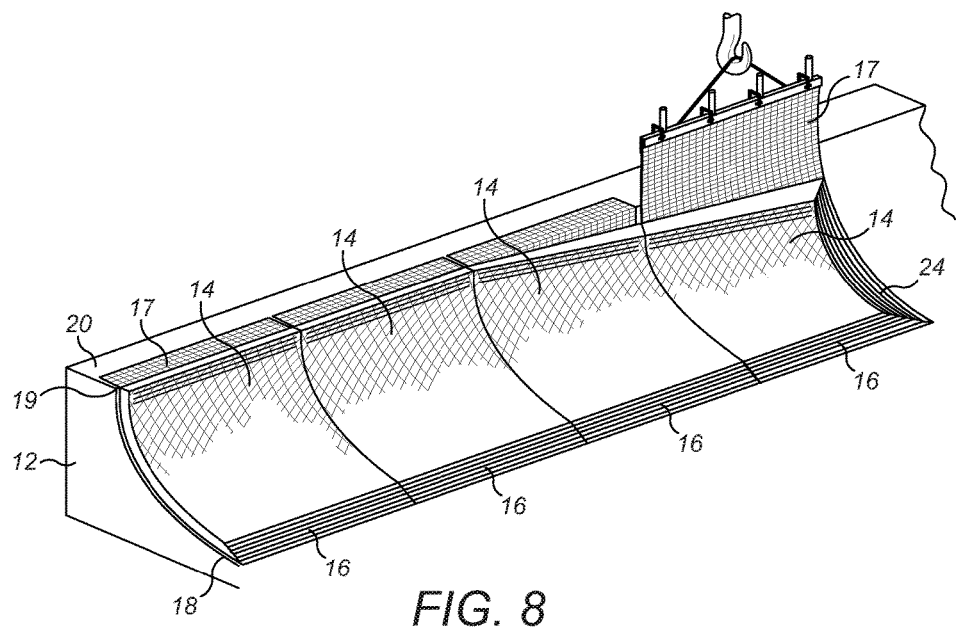
FIG. 8 is a perspective view of a plurality of fibre stacks laid into a mould according to an embodiment of the invention.

In this manner the first stack 14 is draped across the interior profile of the mould to result in the situation illustrated in FIG. 7. The webbing 17 is then fixed to a flange 20 of the mould in order to hold the stack in place. Any creases in the stack 14 are then smoothed out by an operator, and the next stack is suspended over the mould 12 and lowered into position in a similar way. In FIG. 8, a plurality of first sheaves or stacks 14 can be seen draped across a first half of the interior profile of the mould.

Figure 9:
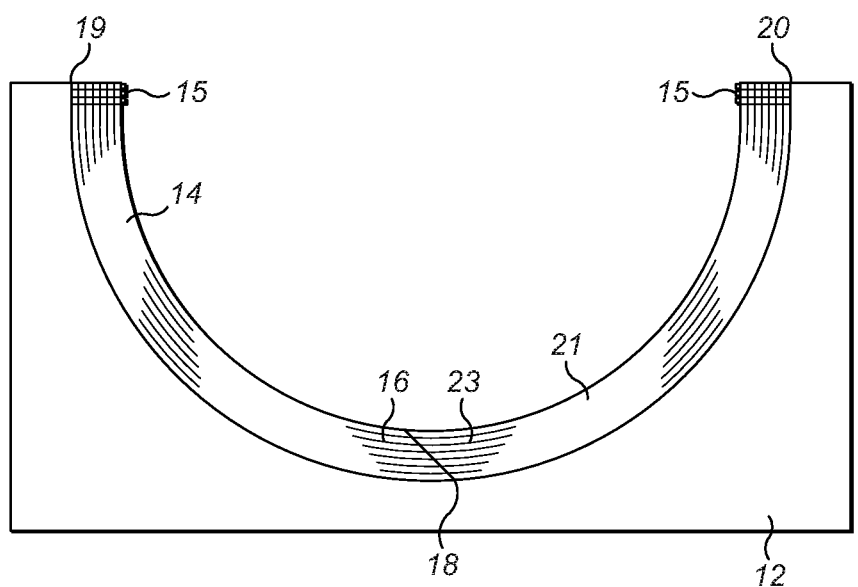
FIG. 9 is a side view of two complementary fibre stacks laid in a mould.

Referring now to FIG. 9, the process of installing the stacks of reinforcing material is now carried on for positions in the mould that are adjacent the already installed stacks 14. An opposing or complementary stack 21 is now suspended above the mould 12 as with the first stack 14. Like the first stack 14, the second stack 21 comprises a plurality of sheets joined together along one edge forming a spine, and having a half-chord length. The respective lengths of the fibre sheets of the second stack 21 are arranged to give a stepwise chamfer 23 that is complementary to the stepwise chamfer 16 of the first stack 14 when the two stacks are in place on the mould 12. This means that the length of the material that is on the outside of the stack (next to the mould surface) is made shorter than the length of the material that is on the inside of the stack.

The second stack is suspended in place above the mould and lowered until the open end of the stack opposite the spine is just touching either the mould surface 13 or the edge of the first stack 14 already installed in the mould (just inside of the open end of the first stack). The second stack is then continually lowered with the edge of the second stack opposite the spine remaining in contact with the surface until the spine is brought towards the edge 22 of the mould opposite the edge 19. The edge 22 may correspond to the trailing edge of the wind turbine blade for example. As the spine 15 of the second stack is brought into place against the edge 22 of the mould surface, the tip of the second stack may be dragged slightly towards the edge 22, allowing the chamfer 23 to be pulled across the chamfer 16 of the first stack so that the two chamfered sections sit squarely on top of one another, and so that the inside surfaces of both first and second stacks are substantially flush with one another. Any remaining creases in the second stack are now smoothed out by an operator, and further stacks are added until all of the reinforcing sections are in place. If the installation is carried out with the edge of the stack 21 first engaging the mould surface not the stack, an operator may be required to pull the open end of the stack 21 into place over the chamfer 16 of the first stack. Assuming all of the other blade components are in place within the mould, the fibre stacks are covered with a vacuum bag, air is evacuated and resin is added to the mould and infused through the sheets so that once cured the sheets form solid shell sections of the wind turbine blade. The webbing is finally cut away.

In order to lower the spine of the stacks towards the mould surface near the trailing or leading edge, support members arranged laterally over the mould may be used. The webbing attached to the spine of the stack can be supported on the members by any suitable means. The support members may for example take the form of guide rails or cables that cooperate with rollers or hooks on the webbing. Additionally, an anchor may be placed on the open end of the stacks in the mould in order to hold them in place and provide tension against which the lowering of the spine may take place.

As mentioned above, the shape of the stack of reinforcing fibres in this example is largely rectangular, as this allows a plurality of stacks to be arranged in the substantially cylindrical blade root. However, where the stacks are laid into parts of the blade that are not in the root section 7, the mould and the blade profile will not be cylindrical but will begin to take on the shape of an aerofoil. Other shapes of stack may therefore be adopted according to their desired position within the mould. It may then also be desirable to apply an index or label to the stack, say on the webbing, to indicate the order in which the stacks should be laid.

In FIG. 8, for example, the stacks of reinforcing fibre demonstrate a gradual tapering as they become more distant from the end of the mould corresponding to the blade root. In this design, the tapering is intended to blend the reinforced fibre sections at the blade root, with spars (not shown) that run along the blade in a longitudinal or span-wise direction. The width of the stacks in the mould therefore reduces to merge with the width of the spars. Additionally, as can be seen in FIG. 8, the last stack in a row of stacks may also have a chamfered side edge 24 providing for a smooth and gradual transition between the reinforced section of the blade near the root, and the lighter-weight interior of the blade shell. The sheets at this side edge of the stack are also preferably not joined to one another along the edge, so that this edge is also open. This is advantageous where a layered carbon fibre spar is used, as the layers of the spar may be interleaved with the layers of the stack to provide optimal load bearing characteristics.

In the example above, the stacks of reinforcing material are constructed so that the chamfers provided on the open ends of the stacks are opposite and complementary. This is helpful as the angled intersection of the two chamfers provides an extended surface area, allowing the sheets to be easily smoothed against one another, and provided an extended surface area for bonding. This makes fabrication of the blade section in the mould easier, and provides a stronger blade.

In alternative embodiments, the first and second stack may be fabricated with sheets of varying lengths that merely compensate for the curvature of the mould surface. Such stacks would still look chamfered when they are laid flat, but once laid in the mould, the join between the stacks would be perpendicular to the mould surface and not angled as illustrated in FIG. 9.

Additionally, although in FIGS. 8 and 9, the stacks along one of the trailing or leading edges are shown as being laid before the stacks along the other edge, it will be appreciated that in alternative embodiments, the stacks may be laid pair wise across the chord length of the mould beginning at either the root or the end of the root section opposite the root.

A second installation for the stacks 14 and 21 will now also be described. In this method, the first fibre stack 14 is suspended above the edge 19 of the interior profile of the mould 13 and any creases in the fibre sheets that make up the fibre stack are allowed to drop out. The first fibre stack 14 is then lowered causing the tip of the chamfered edge 16 to come into contact with the mould surface just inside of the edge 19 of the mould, near the trailing or leading edge. The first fibre stack is then lowered, causing the first fibre stack to slide down the interior profile of the mould until the spine of the first stack meets the edge 19 of the mould and the tip of the chamfered edge 16 is located near the midpoint 18 of the interior profile of the mould. The stack is then smoothed out by an operator, and the spine is fixed in place by attaching the webbing or hem 17 to the mould flange 20.

A similar method is carried out to lay the second fibre stack 21 into the mould 12. In this method, the second fibre stack is suspended over the edge 22 of the interior profile of the mould 12 to allow any creases in the fibre sheets to drop out. The second fibre stack is then lowered causing the tip of the chamfered edge 23 to come into contact with the edge 22 of the mould. The second fibre stack is then lowered, causing the second fibre stack to slide down the interior profile of the mould, until the spine of the second stack meets the edge 22 of the mould and the chamfered edge 23 lies across the chamfered edge 16 at the midpoint 18 of the interior profile of the mould. The chamfered open end of the second stack is likely to need lifting up and over the chamfered end of the first stack that is already in place. The second stack is then smoothed out as before. Further stacks are added until all of the reinforcing sections are in place. Assuming all of the other blade components are in place within the mould, resin is added to the mould and drawn through the sheets so that once cured the sheets form solid shell sections of the wind turbine blade. The webbing is finally. cut away.

The opposing half of the wind turbine blade is formed by carrying out the same method as described above, but using a mould with an appropriately designed interior profile. The two blade moulds can then be joined to assemble the blade halves into a full blade.

In an alternative embodiment, the fibre stacks are not provided with the mounting surfaces 17. Instead, the fibre stacks are suspended in place by clamping around the respective spines of the fibre stacks, using lateral support members or by some other alternative means.

Each stack or stacks 14 preferably contains 20 fibre sheets, equating to an overall thickness of approximately 1 centimeter; however, it will be appreciated that fibre stacks with other thicknesses and sheet numbers could be used in other embodiments of the present invention.

Each fibre sheet in the stack 14 may be made up of unidirectional or biaxial fibres. In an alternative embodiment, the stack is made from a plurality of unidirectional fibre sheets with a different fibre axis to each adjacent fibre sheet. Furthermore, each of the constituent fibre sheets may be made out of a single continuous piece of fibre sheet alternatively a number of discrete fibre sheets joined together.

It will be appreciated that there are many different forms of FRP that could be used to make the wind turbine blade of the present invention; for example a glass fibre, a carbon fibre, an aramid fibre, a polyester fibre, or any combination thereof. Furthermore, alternative reinforcing materials to FRP could be used.

A method of manufacturing a wind turbine blade using pre-fabricated stacks of reinforcing material has been described. The stacks comprise a plurality of plies of fibre material, joined together along a side edge to form a spine, while the opposite edges of the stack are left unjoined so that the plies can separate and slide across one another. In doing so, the stacks can be stored flat, but on installation into a curved mould profile, the plies may slide to adopt the curved shape of the mould. The stacks extend from a point near the leading or trailing edge of the mould to an intermediate point on the mould surface. The stacks may advantageously be used to construct the thickened root section of a wind turbine blade.

The invention claimed is:

1. A method of manufacturing a wind turbine blade, comprising:
    cutting a plurality of plies of reinforcing material to form a stack;
    joining the plurality of plies of reinforcing material to one another along a common edge to from a spine;
    leaving the edge of the plurality of plies of reinforcing material opposite the spine unjoined to form an open end of the stack, and so that the plies in the stack are free to slide across one another; and
    laying the stack in a wind turbine blade mould.

2. The method of claim 1, comprising:
    refraining from adding seams to the stack that extend fully or partially between the sides of the stack between the spine and the open end.

3. The method of claim 1, wherein the lengths of the plies are cut to give the stack a chamfer or wedge-shape at its open end.

4. The method of claim 1 comprising attaching a hem to the edge of the stack forming a spine, wherein the hem allows the stack to be handled.

5. The method of claim 4, comprising installing attachment members in the hem for engaging with one or more support members.

6. A method of manufacturing a wind turbine blade using a mould surface defining the profile of one half of the shell of the wind turbine blade in the blade chord direction from the blade trailing edge to the blade leading edge, and a mould root section corresponding to a root section of the wind turbine blade;

a) receiving a plurality of stacks of reinforcing material for installation in the wind turbine blade mould, wherein each stack includes a plurality of plies of reinforcing material joined to one another along a common edge to form a spine while the opposite edge of the stack is unjoined so that the plies in the stack are free to slide across one another, and each stack has a length such that when laid in the wind turbine blade mould the stack extends along the mould surface of the blade mould from either the trailing or leading edge to a point on the mould surface between the trailing or leading edge;

b) laying a first stack of reinforcing material in the mould so that the spine of the first stack is positioned at the either the trailing or leading edge of the mould and so that the stack extends to a point on the mould surface between the trailing and leading edge; and c) laying a second stack of reinforcing material in the mould so that the spine of the second stack is positioned at the other of the trailing or leading edges and so that the stack extends to a point on the mould surface between the trailing and leading edge and meets the first stack.

7. The method of claim 6, wherein step b) comprises:
suspending the first stack of reinforcing material above the mould so that its spine is upwards and so that the edge of the stack opposite the spine hangs downwards;
after the suspending step, lowering the first stack towards the mould surface so that the edge of the stack opposite the spine makes contact with the mould surface first;
continuing to lower the first stack into the mould, keeping contact between the mould surface and the first stack, until the first stack is in position; and wherein step c) comprises:
suspending the second stack of reinforcing material above the wind turbine blade mould so that its spine is upwards, and so that the edge opposite the spine hangs downwards;
after the suspending step, lowering the second stack towards the mould surface so that the edge of the stack opposite the spine makes contact with the mould surface first;
continuing to lower the second stack into the mould, keeping contact between the mould surface and the second stack, until the second stack is in position.

8. The method of claim 6, wherein step b) comprises:
suspending the first stack of reinforcing material above the root section of the wind turbine blade mould so that its spine is upwards, and so that the edge of the stack opposite the spine hangs downwards over a point of the mould surface intermediate the trailing and leading edge;
after the suspending step, lowering the first stack towards the mould surface so that the edge of the stack opposite the spine makes contact with the mould wall surface;
lowering the spine of the stack towards one of the trailing or leading edges of the mould, until the first stack is in position; and wherein step c) comprises:
suspending the second stack of reinforcing material above the root section of the wind turbine blade mould so that its spine is upwards, and so that the edge of the stack opposite the spine hangs downwards over a point of the mould surface intermediate the trailing and leading edge;
after the suspending step, lowering the second stack towards the mould surface so that the edge of the stack opposite the spine makes contact with the mould surface first, or with the stack already in place;
lowering the spine of the second stack towards the other of the trailing or leading edges of the mould, until the second stack is in position against the first.

9. The method of claim 8 comprising:
after the edge of the first stack opposite the spine makes contact with the mould surface, placing an anchor on the edge of the first stack opposite the spine for the subsequent step of lowering the spine of the first stack; and
after the edge of the second stack opposite the spine makes contact with the mould surface, or with the stack already in place, placing an anchor on the edge of the second stack opposite the spine for the subsequent step of lowering the spine of the second stack.

10. The method of claim 7, wherein the suspending steps comprise suspending the first and/or the second stacks vertically above the mould.

11. The method of claim 10, wherein the suspending steps comprise pausing with the first and the second sheets suspended vertically above the mould.

12. The method of claim 6, wherein the edge of the stack opposite the spine is wedge-shaped or chamfered, so that when the first and the second stacks are in position in the mould the chamfered edge of the first stack lies across the chamfered edge of the second stack.

13. The method of claim 6, wherein the reinforcing material comprises one or more of a glass fibre material, a carbon fibre, an aramid fibre, a polyester fibre material or a combination of these.

14. The method of claim 6, comprising laying stacks of reinforcing material in the root section of a wind turbine blade to cover a region of the mould from the blade root bearing to a point at which the spar caps begin.

15. The method of claim 14, wherein the side of the stacks of reinforcing material adjacent the point at which the spar caps begin is chamfered or wedge-shaped so that once installed the thickness of the stack decreases in the spanwise direction of the blade.

* * * * *